United States Patent
Inoue

(10) Patent No.: US 11,165,518 B2
(45) Date of Patent: Nov. 2, 2021

(54) MOBILE TERMINAL TESTING APPARATUS, MOBILE TERMINAL TESTING SYSTEM, AND CONTROL METHOD FOR MOBILE TERMINAL TESTING APPARATUS

(71) Applicant: ANRITSU CORPORATION, Kanagawa (JP)

(72) Inventor: Naoki Inoue, Kanagawa (JP)

(73) Assignee: ANRITSU CORPORATION, Kanagawa (JP)

( * ) Notice: Subject to any disclaimer, the term of this patent is extended or adjusted under 35 U.S.C. 154(b) by 0 days.

(21) Appl. No.: 17/185,097

(22) Filed: Feb. 25, 2021

(65) Prior Publication Data
US 2021/0281333 A1   Sep. 9, 2021

(30) Foreign Application Priority Data
Mar. 4, 2020 (JP) .............................. JP2020-037055

(51) Int. Cl.
*H04B 17/00* (2015.01)
*H04B 17/15* (2015.01)

(52) U.S. Cl.
CPC ................................. *H04B 17/15* (2015.01)

(58) Field of Classification Search
CPC ... H04W 72/042; H04W 24/08; H04W 88/02; H04W 52/0206; H04W 92/18; H04W 28/0221; H04W 52/0209; H04W 52/146; H04W 8/24; H04B 17/15
See application file for complete search history.

(56) References Cited

U.S. PATENT DOCUMENTS

| | | | |
|---|---|---|---|
| 6,289,217 B1* | 9/2001 | Hamalainen | H04L 1/0015 455/425 |
| 7,046,964 B1* | 5/2006 | Sullivan | H04B 17/318 327/48 |
| 9,860,836 B2* | 1/2018 | Mochizuki | H04W 52/0206 |
| 11,044,646 B2* | 6/2021 | Uemura | H04W 36/36 |
| 2019/0254110 A1* | 8/2019 | He | H04L 5/0048 |

FOREIGN PATENT DOCUMENTS

JP          5739499 B2     6/2015

* cited by examiner

*Primary Examiner* — Nhan T Le
(74) *Attorney, Agent, or Firm* — Pearne & Gordon LLP

(57) ABSTRACT

A test control unit executes first measurement of changing the power of a transmission signal transmitted by the mobile terminal in a first range and second measurement of changing the power of the transmission signal transmitted by the mobile terminal in a second range lower than the first range, determines a first threshold TH1 and a second threshold TH2 based on the measurement result 21 of the second measurement, and divides the measurement period into a first measurement period Tr1, a second measurement period Tr2, and a third measurement period Trc, based on the first threshold TH1 and the second threshold TH2. The test control unit determines, as a test result, a measurement result 21 measured in the second measurement in the first measurement period Tr1 and the second measurement period Tr2, and a measurement result 20 measured in the first measurement in a third measurement period Trc.

8 Claims, 5 Drawing Sheets

MOBILE TERMINAL TESTING APPARATUS, MOBILE TERMINAL TESTING SYSTEM, AND CONTROL METHOD FOR MOBILE TERMINAL TESTING APPARATUS

TECHNICAL FIELD

The present invention relates to a mobile terminal testing apparatus, a mobile terminal testing system, and a control method for a mobile terminal testing apparatus.

BACKGROUND ART

As a mobile terminal testing apparatus in the related art, for example, in Patent Document 1, it has been proposed to obtain the power level waveform of the burst signal actually input, by connecting up and down along the time axis, the level data of the period excluding the period Th, among level data of the period Th whose level is higher than a predetermined threshold set between a high signal level expected to be input during the on period Ton and a low signal level expected to be input during the off periods Toff1 and Toff2 sandwiching the on period Ton, among a series of level data acquired in a low gain mode in order to avoid a noise floor, and level data acquired in a high gain mode to avoid a saturation level.

RELATED ART DOCUMENT

Patent Document

[Patent Document 1] Japanese Patent No. 5739499

DISCLOSURE OF THE INVENTION

Problem that the Invention is to Solve

However, under the condition that the signal-to-noise ratio (S/N ratio) is low, the noise floor may be higher than usual. In this case, since the mobile terminal testing apparatus in the related art as described above sets a constant threshold, there is a problem that the signal level during the off period exceeds the threshold due to the influence of the noise floor even in the high gain mode, and the waveform of the burst signal transmitted from the mobile terminal cannot be accurately obtained.

The present invention has been made to solve such a problem, and an object of the present invention is to provide a mobile terminal testing apparatus, a mobile terminal testing system, and a control method for a mobile terminal testing apparatus, which can accurately obtain the waveform of a transmission signal transmitted by a mobile terminal.

Means for Solving the Problem

A mobile terminal testing apparatus of the present invention is a mobile terminal testing apparatus (1) that tests a waveform of a transmission signal transmitted by a mobile terminal (2), the mobile terminal testing apparatus including: a pseudo base station unit (10) that functions as a base station for the mobile terminal, changes power of the transmission signal transmitted by the mobile terminal in a first range so as to have a first off period, an on period, and a second off period, and further changes the power of the transmission signal transmitted by the mobile terminal in a second range lower than the first range so as to have the first off period, the on period, and the second off period; and a test control unit (13) that controls the pseudo base station unit, the test control unit executes first measurement to measure the power of the transmission signal, changed in the first range, received by the pseudo base station unit, executes second measurement to measure the power of the transmission signal, changed in the second range, received by the pseudo base station unit, determines a first threshold and a second threshold, based on a measurement result measured in the second measurement, specifies a first measurement period until the measurement result of the second measurement reaches the first threshold from the start of the first off period to the end of the on period, specifies a second measurement period until the measurement result of the second measurement reaches the second threshold from the end of the second off period to the start of the on period, and determines, as a test result, a measurement result measured in the second measurement in the first measurement period and the second measurement period, and a measurement result measured in the first measurement in a third measurement period between the first measurement period and the second measurement period.

With this configuration, the mobile terminal testing apparatus of the present invention determines the first threshold and the second threshold, based on the measurement result of the second measurement in which the transmission signal is changed in a range lower than the range of the first measurement, so that the waveform of the transmission signal transmitted by the mobile terminal can be accurately obtained.

In the mobile terminal testing apparatus of the present invention, the test control unit may determine the first threshold, based on the measurement result in the first off period and the measurement result in the on period, which are measured in the second measurement, and determines the second threshold, based on the measurement result in the on period and the measurement result in the second off period, which are measured in the second measurement.

With this configuration, the mobile terminal testing apparatus of the present invention determines a first threshold, based on a measurement result in the first off period and a measurement result in the on period, which are measured in the second measurement, and determines a second threshold, based on a measurement result in the on period and a measurement result in the second off period, which are measured in the second measurement, so that the first threshold and the second threshold can be optimally determined.

Further, in the mobile terminal testing apparatus of the present invention, the test control unit may be configured to determine, as the first threshold, a value obtained by dividing a value, which is obtained by adding a time average value of the measurement result in the first off period and a time average value of the measurement result in the on period, measured in the second measurement, by 2, and determine, as the second threshold, a value obtained by dividing a value, which is obtained by adding a time average value of the measurement result in the on period and a time average value of the measurement result in the second off period, measured in the second measurement, by 2.

With this configuration, the mobile terminal testing apparatus of the present invention determines, as the first threshold, a value obtained by dividing a value, which is obtained by adding a time average value of the measurement result in the first off period and a time average value of the measurement result in the on period, measured in the second measurement, by 2, and determines, as the second threshold, a value obtained by dividing a value, which is obtained by adding a time average value of the measurement result in the on period and a time average value of the measurement result in the second off period, measured in the second measurement, by 2, so that the first threshold and the second threshold can be optimally determined.

The mobile terminal testing apparatus of the present invention may include a display unit (14) that displays the waveform of the transmission signal transmitted by the mobile terminal, in which the test control unit may be configured to display information in which the measurement results measured in the second measurement in the first measurement period and the second measurement period are arranged in chronological order, on the display unit, and display information in which the measurement results measured in the first measurement in the third measurement period between the first measurement period and the second measurement period are arranged in chronological order, on the display unit.

With this configuration, the mobile terminal testing apparatus of the present invention can visually recognize the waveform of the transmission signal transmitted by the mobile terminal.

A mobile terminal testing system of the present invention includes a mobile terminal testing apparatus (1) that tests a waveform of a transmission signal transmitted by a mobile terminal (2); and a test control apparatus (4) that controls the mobile terminal testing apparatus, in which the mobile terminal testing apparatus has a pseudo base station unit (10) that functions as a base station for the mobile terminal, changes power of the transmission signal transmitted by the mobile terminal in a first range so as to have a first off period, an on period, and a second off period, and further changes the power of the transmission signal transmitted by the mobile terminal in a second range lower than the first range so as to have the first off period, the on period, and the second off period, the test control apparatus has a test control unit (13) that controls the pseudo base station unit, and the test control unit executes first measurement to measure the power of the transmission signal, changed in the first range, received by the pseudo base station unit, executes second measurement to measure the power of the transmission signal, changed in the second range, received by the pseudo base station unit, determines a first threshold and a second threshold, based on a measurement result measured in the second measurement, specifies a first measurement period until the measurement result of the second measurement reaches the first threshold from the start of the first off period to the end of the on period, specifies a second measurement period until the measurement result of the second measurement reaches the second threshold from the end of the second off period to the start of the on period, and determines, as a test result, a measurement result measured in the second measurement in the first measurement period and the second measurement period, and a measurement result measured in the first measurement in a third measurement period between the first measurement period and the second measurement period.

With this configuration, the mobile terminal testing system of the present invention determines the first threshold and the second threshold, based on the measurement result of the second measurement in which the transmission signal is changed in a range lower than the range of the first measurement, so that the waveform of the transmission signal transmitted by the mobile terminal can be accurately obtained.

A control method for a mobile terminal testing apparatus of the present invention is a control method for a mobile terminal testing apparatus (1) which includes a pseudo base station unit (10) that functions as a base station for a mobile terminal (2), and a test control unit (13) that controls the pseudo base station unit, and tests a waveform of a transmission signal transmitted by the mobile terminal, the control method causing the test control unit to execute: a first measurement execution step of controlling the pseudo base station unit such that power of a transmission signal transmitted by the mobile terminal changes in a first range so as to have a first off period, an on period, and a second off period, and executing first measurement to measure the power of the transmission signal received by the pseudo base station unit; a second measurement execution step of controlling the pseudo base station unit such that power of the transmission signal transmitted by the mobile terminal changes in a second range lower than the first range so as to have the first off period, the on period, and the second off period, and executing second measurement to measure the power of the transmission signal received by the pseudo base station unit; a threshold determination step of determining a first threshold and a second threshold, based on a measurement result measured in the second measurement; a first measurement period specifying step of specifying a first measurement period until the measurement result of the second measurement reaches the first threshold from the start of the first off period to the end of the on period; a second measurement period specifying step of specifying a second measurement period until the measurement result of the second measurement reaches the second threshold from the end of the second off period to the start of the on period; and a test result determining step of determining, as a test result, a measurement result measured in the second measurement in the first measurement period and the second measurement period, and a measurement result measured in the first measurement in a third measurement period between the first measurement period and the second measurement period.

As described above, the control method for the mobile terminal testing apparatus of the present invention determines the first threshold and the second threshold, based on the measurement result of the second measurement in which the transmission signal is changed in a range lower than the range of the first measurement, so that the waveform of the transmission signal transmitted by the mobile terminal can be accurately obtained.

Advantage of the Invention

The present invention can provide a mobile terminal testing apparatus, a mobile terminal testing system, and a control method for a mobile terminal testing apparatus, which can accurately obtain the waveform of a transmission signal transmitted by a mobile terminal.

BEST MODE FOR CARRYING OUT THE INVENTION

Embodiments of the present invention will be described below with reference to the drawings. In the embodiment of the present invention, an example will be described in which the mobile terminal testing apparatus according to the present invention is applied to a mobile terminal testing apparatus for testing a mobile terminal conforming to the standard specifications of 5G New Radio (NR) which is a 5th Generation (5G) wireless system.

Figure 1:
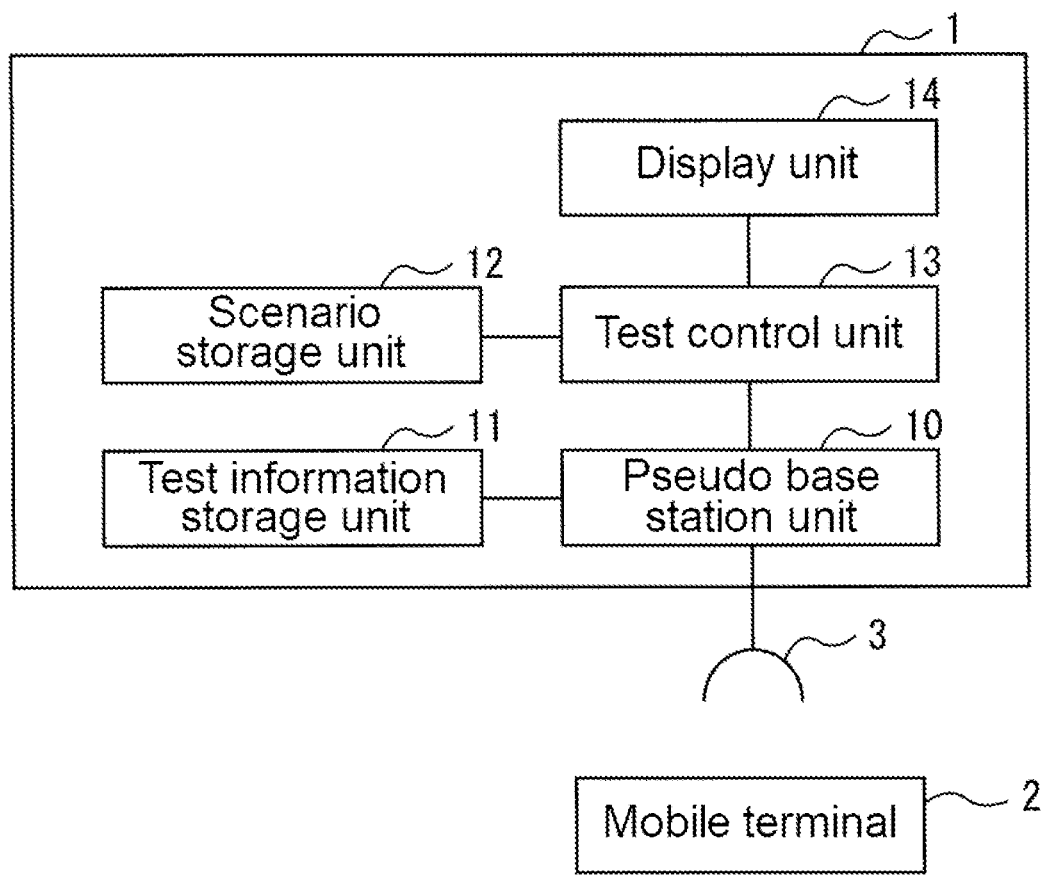
FIG. 1 is a block diagram of a mobile terminal testing apparatus according to an embodiment of the present invention.

As shown in FIG. 1, a mobile terminal testing apparatus 1 wirelessly transmits and receives signals to and from a mobile terminal 2 via an antenna 3. Further, the mobile terminal testing apparatus 1 can transmit and receive signals to and from the mobile terminal 2 by wire via a coaxial cable or the like.

The mobile terminal testing apparatus 1 includes a pseudo base station unit 10 that functions as a base station of the mobile terminal, a test information storage unit 11 that stores test information including parameters for controlling the pseudo base station unit 10, a scenario storage unit 12 which stores information including a scenario for testing a mobile terminal 2, a test control unit 13 that controls the pseudo base station unit 10, based on the information stored in the scenario storage unit 12, and a display unit 14 that displays test results of the mobile terminal 2, and the like.

The mobile terminal testing apparatus 1 is a computer device (not shown) provided with a communication circuit for communicating with the mobile terminal 2. The computer device includes a central processing unit (CPU), a read only memory (ROM), a random access memory (RAM), a hard disk device, an input/output port, and a touch panel, which are not shown.

A program for making a computer device function as a mobile terminal testing apparatus 1 is stored in a ROM and a hard disk device of the computer device. That is, the CPU executes the program stored in the ROM with the RAM as a work area, and the computer device functions as the mobile terminal testing apparatus 1.

The pseudo base station unit 10 includes a CPU and a communication circuit. The test information storage unit 11 and the scenario storage unit 12 is a RAM or a hard disk device. The test control unit 13 is a CPU.

The display unit 14 is a liquid crystal display device that constitutes a touch panel. The touch panel includes a liquid crystal display device and a touch pad. Through this touch pad, the test control unit 13 is subjected to test selection, test execution instruction, test parameter setting, test result display adjustment, and the like.

In the present embodiment, an example in which the mobile terminal testing apparatus executes an on/off time mask test for testing that a signal conforming to the Transmit ON/OFF time mask specified in 3GPP TS 38.521-1 is output from the mobile terminal 2 will be described. In 5G NR, a radio frame is composed of 10 subframes, and one subframe is composed of one or more slots.

In the on/off time mask test of the present embodiment, the test control unit 13 controls the pseudo base station unit 10 such that three consecutive slots of the transmission signal transmitted by the mobile terminal 2 are a first off period, a on period, and a second off period, respectively, and performs level measurement for measuring the power of the transmission signal received by the pseudo base station unit 10.

The test control unit 13 executes the level measurement twice by changing the range for turning on/off the transmission signal transmitted by the mobile terminal 2. As a pre-process for level measurement, the test control unit 13 controls the pseudo base station unit 10 so as to set the range of the transmission signal transmitted by the mobile terminal 2 to a first range.

For example, the test control unit 13 sets the range of the transmission signal transmitted by the mobile terminal 2 to the first range, by transmitting the Input Level command for designating the transmission level of the uplink signal from the pseudo base station unit 10 to the mobile terminal 2.

As the first level measurement, the test control unit 13 controls the pseudo base station unit 10 such that three consecutive slots of the transmission signal transmitted by the mobile terminal 2 are turned off, on, and off, respectively, measures the power of the transmission signal received in the pseudo base station unit 10, and executes level measurement for correcting the measurement result based on the difference of the first range with respect to the reference range (hereinafter, referred to as "first measurement").

After executing the first measurement, the test control unit 13 controls the pseudo base station unit 10 so as to set the range of the transmission signal transmitted by the mobile terminal 2 to a second range lower than the first range. For example, the test control unit 13 controls the pseudo base station unit 10 so as to change the range of the transmission signal transmitted by the mobile terminal to the second range, by transmitting the Input Level command to the mobile terminal 2.

As the second level measurement, as in the first level measurement, the test control unit 13 controls the pseudo base station unit 10 such that three consecutive slots of the transmission signal transmitted by the mobile terminal 2 are turned off, on, and off, respectively, measures the power of the transmission signal received in the pseudo base station unit 10, and executes level measurement for correcting the measurement result based on the difference of the second range with respect to the reference range (hereinafter, referred to as "second measurement").

Figure 2A:
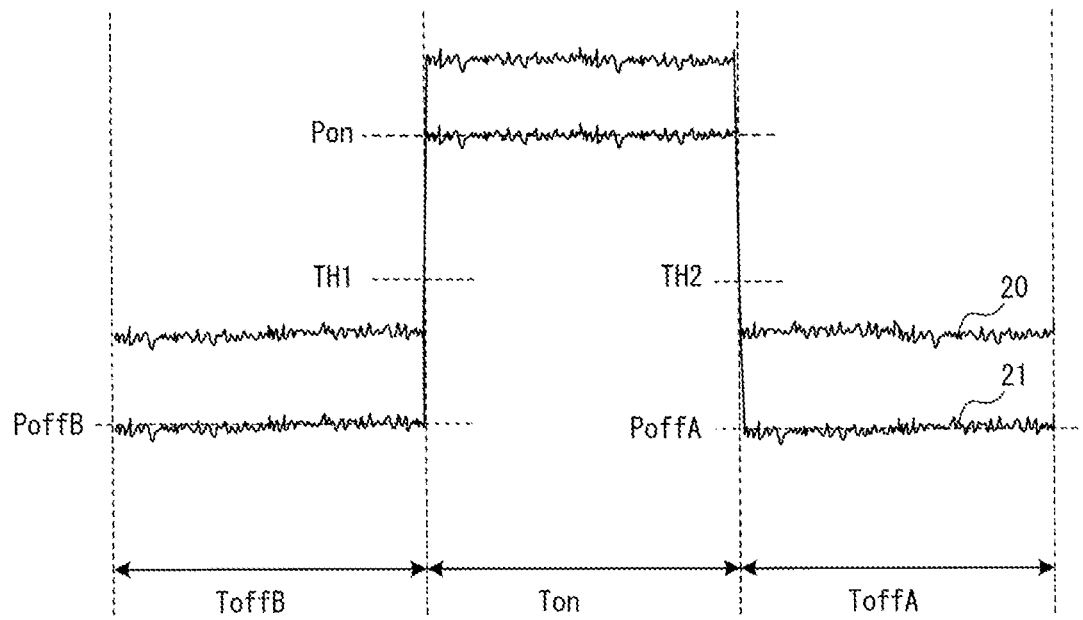
FIG. 2A is a conceptual diagram showing an example of measurement results of an on/off time mask test by the mobile terminal testing apparatus according to the embodiment of the present invention.
Figure 2B:
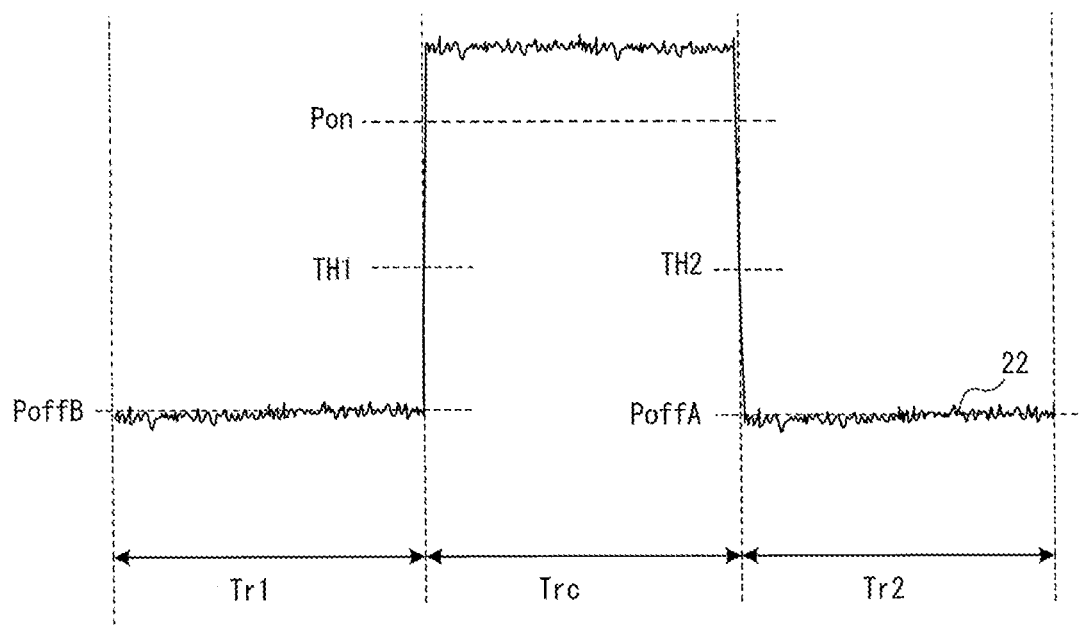
FIG. 2B is a conceptual diagram showing an example of test results of an on/off time mask test by the mobile terminal testing apparatus according to the embodiment of the present invention.

The measurement results of the first measurement and the second measurement are stored in the RAM or the hard disk device. FIG. 2A shows an example of a measurement result 20 of the first measurement and a measurement result 21 of the second measurement, and FIG. 2B shows an example of a final test result 22.

As illustrated in FIG. 2A, there may be a slight difference between the measurement result 20 of the first measurement and the measurement result 21 of the second measurement, even if the correction is performed according to the range. Therefore, the test control unit 13 determines a first threshold TH1 and a second threshold TH2, based on the measurement result of the second measurement.

The test control unit 13 determines the first threshold TH1, based on the measurement result in the first off period ToffB and the measurement result in the on period Ton which are measured in the second measurement. For example, the test control unit 13 determines, as the first threshold TH1, a value obtained by dividing a value, which is obtained by adding a time average value PoffB of the measurement result in the first off period ToffB and a time average value Pon of the measurement result in the on period Ton, measured in the second measurement, by 2.

The test control unit 13 determines the second threshold TH2, based on the measurement result of the on period Ton and the measurement result of the second off period ToffA which are measured in the second measurement. For example, the test control unit 13 determines, as the second threshold TH2, a value obtained by dividing a value, which is obtained by adding time average value Pon of the measurement result in the on period Ton and a time average value PoffA of the measurement result in the second off period ToffA, measured in the second measurement, by 2.

As shown in FIG. 2B, the test control unit 13 specifies the first measurement period Tr1 until the measurement result of the second measurement reaches the first threshold TH1 from the start of the first off period ToffB to the end of the on period Ton.

The test control unit 13 specifies the second measurement period Tr2 until the measurement result of the second measurement reaches the second threshold TH2 from the end of the second off period ToffA to the start of the on period Ton.

The test control unit 13 sets, as the test result, the measurement result measured in the second measurement in the first measurement period Tr1 and the second measurement period Tr2, and the measurement result measured in the first measurement in the third measurement period Trc between the first measurement period Tr1 and the second measurement period Tr2.

In the test information storage unit 11, the parameters of the Input Level command in the first measurement (that is, the first range), the parameters of the Input Level command in the second measurement (that is, the second range), the sampling frequency of the measurement result in the first measurement and the second measurement, and the like are stored in advance as test parameters.

The first range is from the minimum level to the maximum level in the first measurement, and the second range is from the minimum level to the maximum level in the second measurement. When the second range is lower than the first range, it means that the maximum level in the second measurement is lower than the maximum level in the first measurement, and the minimum level in the second measurement is lower than the minimum level in the first measurement.

The sampling frequency of the measurement result is set to an appropriate value within a predetermined range sufficiently shorter than the length of one slot. These test parameters can be changed via the test control unit 13 using a touch panel or the like.

Figure 3:
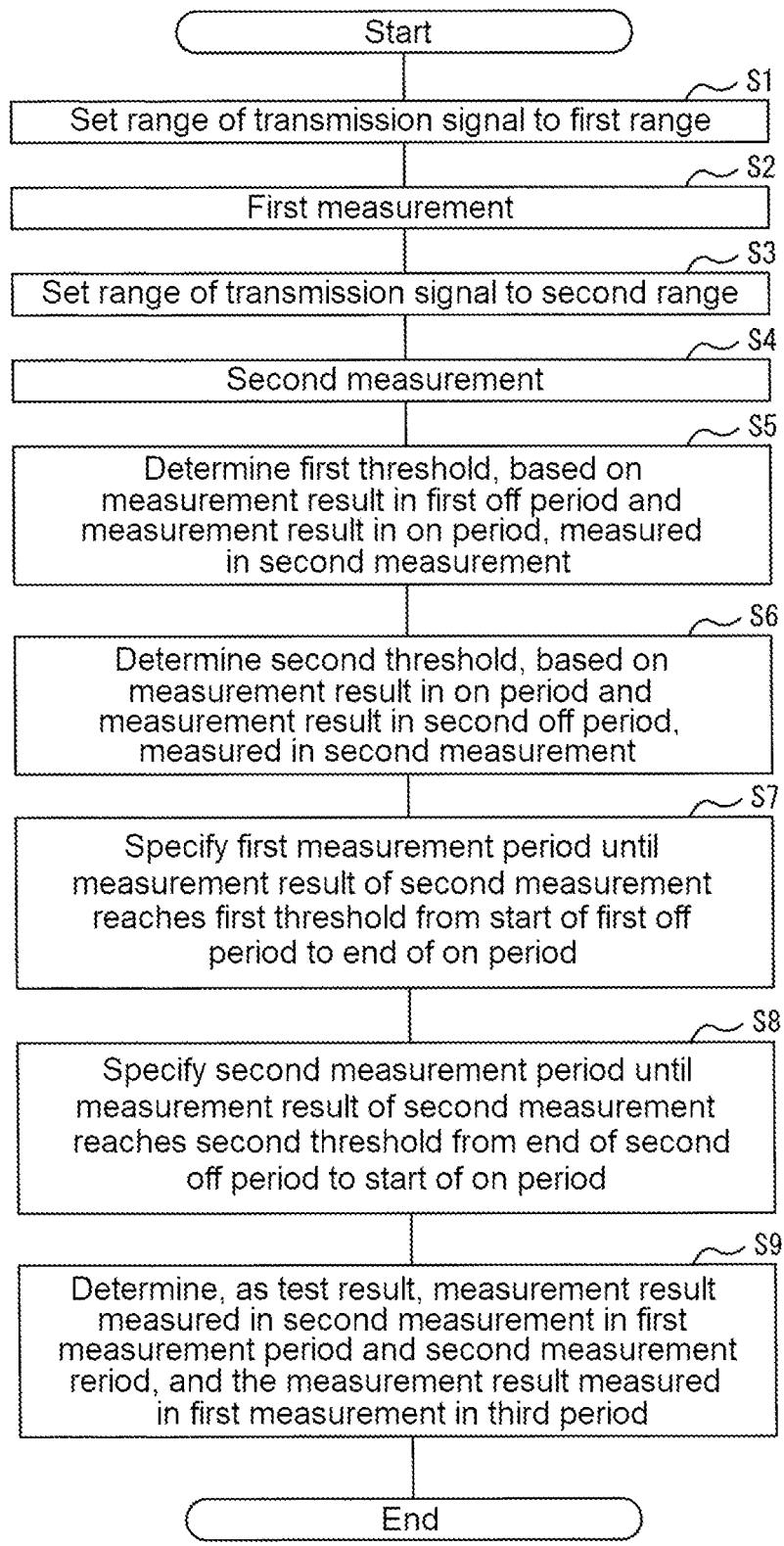
FIG. 3 is a flowchart showing an on/off time mask test operation of the mobile terminal testing apparatus according to the embodiment of the present invention.

The on/off time mask test operation of the mobile terminal testing apparatus 1 according to the embodiment of the present invention configured as described above will be described with reference to FIG. 3.

First, the test control unit 13 controls the pseudo base station unit 10 so as to set the range of the transmission signal transmitted by the mobile terminal 2 to the first range (step S1). Next, the test control unit 13 executes the first measurement (step S2: first measurement execution step).

Next, the test control unit 13 controls the pseudo base station unit 10 so as to set the range of the transmission signal transmitted by the mobile terminal 2 to the second range (step S3). Next, the test control unit 13 executes the second measurement (step S4: second measurement execution step).

Next, the test control unit 13 determines the first threshold TH1, based on the measurement result in the first off period ToffB and the measurement result in the on period Ton which are measured in the second measurement (step S5: threshold determination step).

Next, the test control unit 13 determines the second threshold TH2, based on the measurement result of the on period Ton and the measurement result of the second off period ToffA which are measured in the second measurement (step S6: threshold determination step).

Next, the test control unit 13 specifies the first measurement period Tr1 until the measurement result of the second measurement reaches the first threshold TH1 from the start of the first off period ToffB to the end of the on period Ton (step S7: first measurement period specifying step).

Next, the test control unit 13 specifies the second measurement period Tr2 until the measurement result of the second measurement reaches the second threshold TH2 from the end of the second off period ToffA to the start of the on period Ton (step S8: second measurement period specifying step).

Next, the test control unit 13 determines, as the test result, the measurement result measured in the second measurement in the first measurement period Tr1 and the second measurement period Tr2, and the measurement result measured in the first measurement in the third measurement period Trc (step S9: test result determining step), and the on/off time mask test operation is completed.

Figure 4:
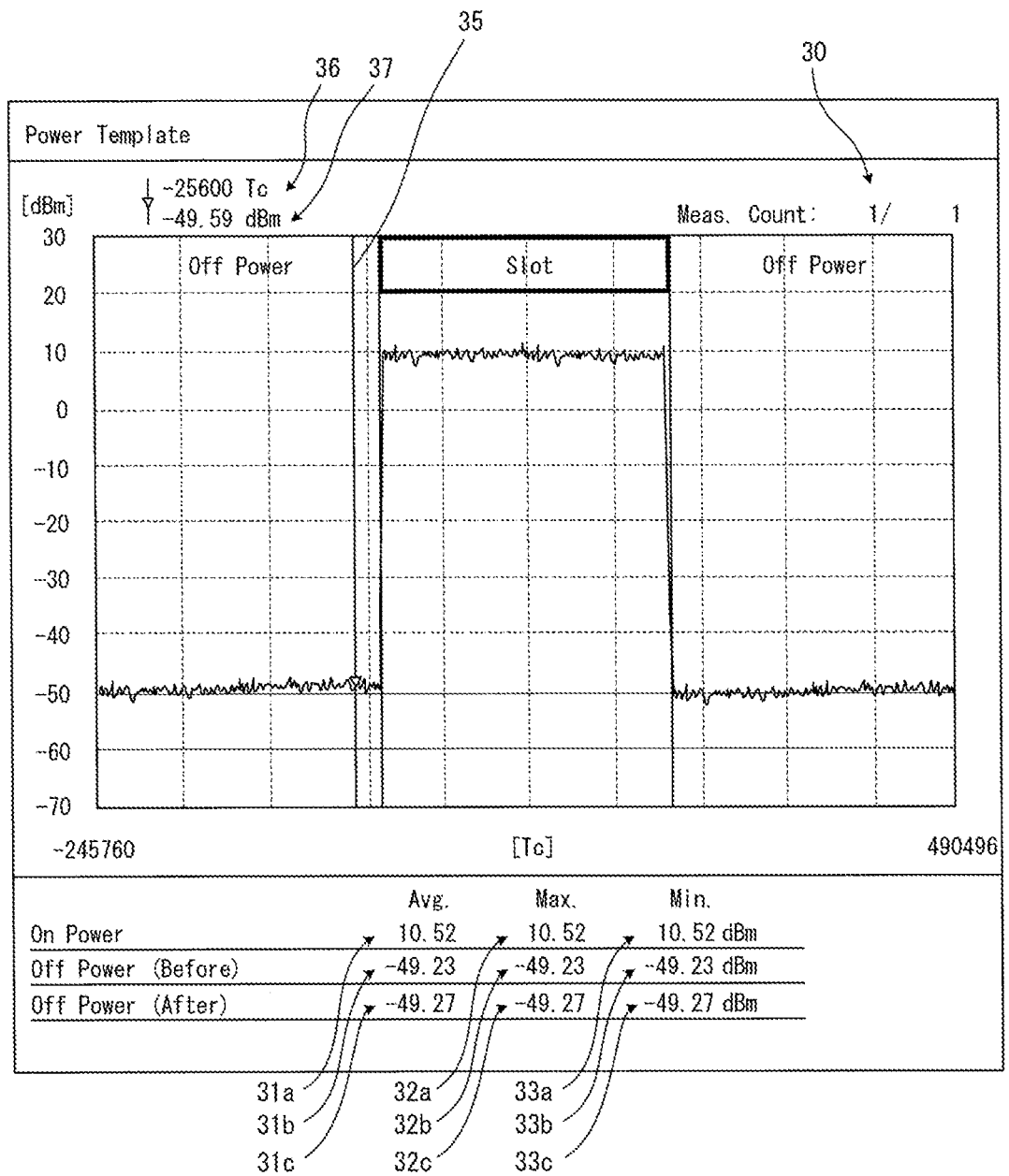
FIG. 4 is a diagram showing a display example of a test result display screen displayed by the mobile terminal testing apparatus according to the embodiment of the present invention.

When the test control unit 13 is instructed to start the on/off time mask test, the test control unit 13 repeatedly executes the above-described on/off time mask test operation, and as shown in FIG. 4, displays the test result display screen showing the test result of the on/off time mask test, on the display unit 14.

The test control unit 13 displays information in which the measurement results measured in the second measurement in the first measurement period Tr1 and the second measurement period Tr2 are arranged in chronological order on the test result display screen, and displays information in which the measurement results measured in the first measurement in the third measurement period Trc are arranged in chronological order on the test result display screen.

On the test result display screen, an execution count display area 30 indicating the number of executions of the on/off time mask test operation, and a statistical information display area where statistical information on the measurement results in the first measurement period Tr1, the second measurement period Tr2, and the third measurement period Trc are displayed are provided.

The statistical information display area includes, for the third measurement period Trc ("On Power" in FIG. 4), the first measurement period Tr1 ("Off Power (Before)" in FIG. 4), and the second measurement period Tr2 ("Off Power (After)" in FIG. 4), average value display areas 31a, 31b, and 31c indicating the average values of the test results, maximum value display areas 32a, 32b, and 32c indicating the maximum values of the test results, and minimum value display areas 33a, 33b, and 33c indicating the minimum values of the test results.

Further, on the test result display screen, a cursor 35 that can be moved in the time axis direction according to an operation of a touch panel or the like is displayed. The position of the cursor 35 on the time axis is displayed in the cursor position display area 36. The test result corresponding to the time axis of the cursor 35 is displayed in the cursor value display area 37.

As described above, in the present embodiment, the first threshold TH1 and the second threshold TH2 are determined, based on the measurement result of the second measurement in which the transmission signal is changed in a range lower than the range of the first measurement, so that the waveform of the transmission signal transmitted by the mobile terminal 2 can be accurately obtained.

Further, in the present embodiment, the first threshold TH1 is determined based on the measurement result in the first off period ToffB and the measurement result in the on period Ton, which are measured in the second measurement, and the second threshold TH2 is determined based on the measurement result in the on period Ton and the measurement result in the second off period ToffA, which are measured in the second measurement, so that the first threshold TH1 and the second threshold TH2 can be optimally determined.

Further, in the present embodiment, a value obtained by dividing a value, which is obtained by adding a time average value PoffB of the measurement result in the first off period ToffB and a time average value Pon of the measurement result in the on period Ton, measured in the second measurement, by 2 is determined as the first threshold TH1, and a value obtained by dividing a value, which is obtained by adding the time average value Pon and a time average value PoffA of the measurement result in the second off period ToffA by 2 is determined as the second threshold TH2, so that the first threshold TH1 and the second threshold TH2 can be optimally determined.

Further, in the present embodiment, information in which the measurement results measured in the first measurement in the first measurement period Tr1 and the second measurement period Tr2 are arranged in chronological order is displayed on the display unit 14, and information in which the measurement results measured in the second measurement in the third measurement period Trc are arranged in chronological order is displayed on the display unit 14, so that the waveform of the transmission signal transmitted by the mobile terminal 2 can be visually recognized.

The mobile terminal testing apparatus 1 in the present embodiment may be configured to connect a general-purpose computer device including a CPU, a RAM, a ROM, a flash memory, a hard disk device, and a communication module.

Figure 5:
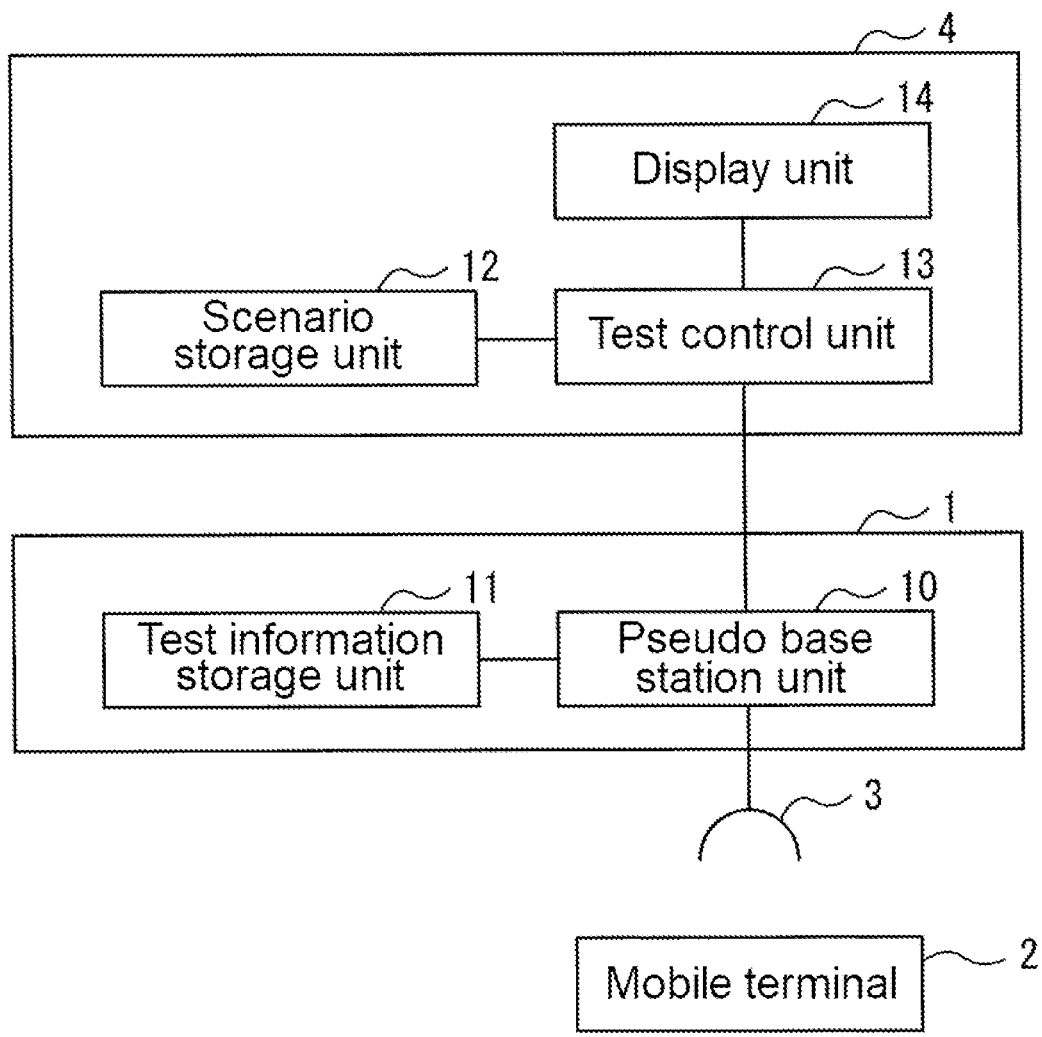
FIG. 5 is a block diagram of a mobile terminal testing system according to a modification example of the embodiment of the present invention.

In this case, as shown in FIG. 5, the test control apparatus 4 including the scenario storage unit 12, the test control unit 13, and the display unit 14 is configured by a general-purpose computer device, and the mobile terminal testing system may be configured by the mobile terminal testing apparatus 1 excluding the scenario storage unit 12, the test control unit 13, and the display unit 14, and the test control apparatus 4.

Although the embodiment of the present invention has been disclosed above, modifications may be made easily without departing from the scope of the invention. The embodiment of the present invention is disclosed on the premise that the equivalent with such modifications is included in the invention described in the claims.

DESCRIPTION OF REFERENCE NUMERALS AND SIGNS

1 Mobile terminal testing apparatus
2 Mobile terminal
4 Test control apparatus
10 Pseudo base station
11 Test information storage unit
13 Test control unit
14 Display unit

What is claimed is:

1. A mobile terminal testing apparatus that tests a waveform of a transmission signal transmitted by a mobile terminal, the mobile terminal testing apparatus comprising:
a pseudo base station unit that functions as a base station for the mobile terminal, changes power of the transmission signal transmitted by the mobile terminal in a first range so as to have a first off period, an on period, and a second off period, and further changes the power of the transmission signal transmitted by the mobile terminal in a second range lower than the first range so as to have the first off period, the on period, and the second off period; and
a test control unit that controls the pseudo base station unit, wherein
the test control unit
executes first measurement to measure the power of the transmission signal, changed in the first range, received by the pseudo base station unit,
executes second measurement to measure the power of the transmission signal, changed in the second range, received by the pseudo base station unit,
determines a first threshold and a second threshold, based on a measurement result measured in the second measurement,
specifies a first measurement period until the measurement result of the second measurement reaches the first threshold from the start of the first off period to the end of the on period,
specifies a second measurement period until the measurement result of the second measurement reaches the second threshold from the end of the second off period to the start of the on period, and
determines, as a test result, a measurement result measured in the second measurement in the first measurement period and the second measurement period, and a measurement result measured in the first measurement in a third measurement period between the first measurement period and the second measurement period.

2. The mobile terminal testing apparatus according to claim 1, wherein
the test control unit
determines the first threshold, based on the measurement result in the first off period and the measurement result in the on period, which are measured in the second measurement, and
determines the second threshold, based on the measurement result in the on period and the measurement result in the second off period, which are measured in the second measurement.

3. The mobile terminal testing apparatus according to claim 2, wherein
the test control unit
determines, as the first threshold, a value obtained by dividing a value, which is obtained by adding a time average value of the measurement result in the first off period and a time average value of the measurement result in the on period, measured in the second measurement, by 2, and
determines, as the second threshold, a value obtained by dividing a value, which is obtained by adding a time average value of the measurement result in the on period and a time average value of the measurement result in the second off period, measured in the second measurement, by 2.

4. The mobile terminal testing apparatus according to claim 1, further comprising:
a display unit that displays the waveform of the transmission signal transmitted by the mobile terminal, wherein
the test control unit displays information in which the measurement results measured in the second measurement in the first measurement period and the second measurement period are arranged in chronological order, on the display unit, and displays information in which the measurement results measured in the first measurement in the third measurement period between the first measurement period and the second measurement period are arranged in chronological order, on the display unit.

5. The mobile terminal testing apparatus according to claim 2, further comprising:
a display unit that displays the waveform of the transmission signal transmitted by the mobile terminal, wherein
the test control unit displays information in which the measurement results measured in the second measurement in the first measurement period and the second measurement period are arranged in chronological order, on the display unit, and displays information in which the measurement results measured in the first measurement in the third measurement period between the first measurement period and the second measurement period are arranged in chronological order, on the display unit.

6. The mobile terminal testing apparatus according to claim 3, further comprising:
a display unit that displays the waveform of the transmission signal transmitted by the mobile terminal, wherein
the test control unit displays information in which the measurement results measured in the second measurement in the first measurement period and the second measurement period are arranged in chronological order, on the display unit, and displays information in which the measurement results measured in the first measurement in the third measurement period between the first measurement period and the second measurement period are arranged in chronological order, on the display unit.

7. A mobile terminal testing system comprising:
a mobile terminal testing apparatus that tests a waveform of a transmission signal transmitted by a mobile terminal; and
a test control apparatus that controls the mobile terminal testing apparatus, wherein
the mobile terminal testing apparatus has
a pseudo base station unit that functions as a base station for the mobile terminal, changes power of the transmission signal transmitted by the mobile terminal in a first range so as to have a first off period, an on period, and a second off period, and further changes the power of the transmission signal transmitted by the mobile terminal in a second range lower than the first range so as to have the first off period, the on period, and the second off period,
the test control apparatus has
a test control unit that controls the pseudo base station unit, and
the test control unit executes first measurement to measure the power of the transmission signal, changed in the first range, received by the pseudo base station unit,
executes second measurement to measure the power of the transmission signal, changed in the second range, received by the pseudo base station unit,
determines a first threshold and a second threshold, based on a measurement result measured in the second measurement,
specifies a first measurement period until the measurement result of the second measurement reaches the first threshold from the start of the first off period to the end of the on period,
specifies a second measurement period until the measurement result of the second measurement reaches the second threshold from the end of the second off period to the start of the on period, and
determines, as a test result, a measurement result measured in the second measurement in the first measurement period and the second measurement period, and a measurement result measured in the first measurement in a third measurement period between the first measurement period and the second measurement period.

8. A control method for a mobile terminal testing apparatus which includes
a pseudo base station unit that functions as a base station for a mobile terminal, and
a test control unit that controls the pseudo base station unit, and
tests a waveform of a transmission signal transmitted by the mobile terminal, the control method causing the test control unit to execute:
a first measurement execution step of controlling the pseudo base station unit such that power of a transmission signal transmitted by the mobile terminal changes in a first range so as to have a first off period, an on period, and a second off period, and executing first measurement to measure the power of the transmission signal received by the pseudo base station unit;
a second measurement execution step of controlling the pseudo base station unit such that power of the transmission signal transmitted by the mobile terminal changes in a second range lower than the first range so as to have the first off period, the on period, and the second off period, and executing second measurement to measure the power of the transmission signal received by the pseudo base station unit;
a threshold determination step of determining a first threshold and a second threshold, based on a measurement result measured in the second measurement;
a first measurement period specifying step of specifying a first measurement period until the measurement result of the second measurement reaches the first threshold from the start of the first off period to the end of the on period;
a second measurement period specifying step of specifying a second measurement period until the measurement result of the second measurement reaches the second threshold from the end of the second off period to the start of the on period; and
a test result determining step of determining, as a test result, a measurement result measured in the second measurement in the first measurement period and the second measurement period, and a measurement result measured in the first measurement in a third measurement period between the first measurement period and
the second measurement period.

\* \* \* \* \*